(12) United States Patent
Lenzing

(10) Patent No.: US 6,797,040 B2
(45) Date of Patent: Sep. 28, 2004

(54) DEVICE FOR THE SEPARATION OF GAS AND LIQUID/SOLID PARTICLES IN A MIXTURE OF GAS AND FLUID/SOLID PARTICLES FLOWING IN A LINE AND METHOD FOR THE SEPARATION THEREOF

(75) Inventor: Thomas Lenzing, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/168,164

(22) PCT Filed: Oct. 16, 2001

(86) PCT No.: PCT/DE01/03895

§ 371 (c)(1),
(2), (4) Date: Oct. 18, 2002

(87) PCT Pub. No.: WO02/32546

PCT Pub. Date: Apr. 25, 2002

(65) Prior Publication Data

US 2003/0075046 A1 Apr. 24, 2003

(30) Foreign Application Priority Data

Oct. 17, 2000 (DE) .......................... 100 51 307

(51) Int. Cl.⁷ .......................... B01D 45/06; B01D 45/08
(52) U.S. Cl. .............................. 95/267; 55/462; 55/464; 55/465; 55/DIG. 19; 96/422
(58) Field of Search .......................... 55/465, 464, 462, 55/DIG. 19; 95/267; 96/420–422

(56) References Cited

U.S. PATENT DOCUMENTS

| | | | | | |
|---|---|---|---|---|---|
| 1,490,186 | A | * | 4/1924 | Rowe | 220/203.03 |
| 1,773,073 | A | | 8/1930 | Beach | 55/441 |
| 2,419,664 | A | * | 4/1947 | Tabbert | 96/381 |
| 2,474,540 | A | * | 6/1949 | Marsh | 55/444 |
| 3,870,494 | A | * | 3/1975 | Doane | 55/443 |
| 3,895,926 | A | * | 7/1975 | Lerner | 95/219 |
| 3,932,151 | A | * | 1/1976 | Lau | 96/325 |
| 4,175,935 | A | * | 11/1979 | Gutermuth et al. | 55/434.1 |
| 4,175,937 | A | * | 11/1979 | Brandau et al. | 55/419 |
| 4,933,047 | A | * | 6/1990 | Bannon | 202/197 |
| 5,429,649 | A | * | 7/1995 | Robin | 96/405 |
| 5,507,858 | A | | 4/1996 | Jepson | 95/262 |
| 5,800,582 | A | * | 9/1998 | Palmer et al. | 55/396 |

FOREIGN PATENT DOCUMENTS

| | | |
|---|---|---|
| DE | 733 263 | 2/1943 |
| DE | 43 31 684 | 3/1995 |
| DE | 196 54 335 | 6/1998 |
| EP | 0 638 885 | 2/1995 |
| WO | WO 94 08502 | 4/1994 |

* cited by examiner

Primary Examiner—Richard L. Chiesa
(74) Attorney, Agent, or Firm—Kenyon & Kenyon

(57) ABSTRACT

A device for separating gas and liquid/solid particles from a gas/liquid/solid particle mixture having a line in which the medium flows, a deflecting element situated in the line, which generates separating vortexes in the medium and thus separates gas from liquid/solid particles.

22 Claims, 2 Drawing Sheets

DEVICE FOR THE SEPARATION OF GAS AND LIQUID/SOLID PARTICLES IN A MIXTURE OF GAS AND FLUID/SOLID PARTICLES FLOWING IN A LINE AND METHOD FOR THE SEPARATION THEREOF

FIELD OF THE INVENTION

The present invention relates to a device for separating gas and liquid or solid particles from a gas/liquid/solid particle mixture flowing in a line and a method for separating the same.

BACKGROUND INFORMATION

A device and method for separating gas and liquid from a gas/liquid mixture flowing in a line are described in U.S. Pat. No. 5,507,858. This device, however, necessarily includes two outlet openings.

In process engineering in general and in automotive engineering, e.g., in the case of rainwater in the intake connection piece of the air filter housing, and in other technical fields of application, the problem frequently occurs that liquids are mixed with gases or vapors and they must be separated. Depending on the application, the problems caused by liquids include corrosion, malfunctions and possibly the destruction of equipment.

During the operation of a measuring device having a measuring element to determine parameters of a test medium flowing in a channel, for example, an intake connection piece of an internal combustion engine, it may occur that air, oil droplets or oil vapor from a line such as, for example, a crankcase vent line, or other foreign particles flow into the channel against the main direction of flow of the test medium contaminating the measuring element by the oil or the foreign particles. As a result, the measuring characteristics of the measuring element can noticeably deteriorate.

Reasons for the backflow include, for example, pulsating flows or a pressure relief of a crankcase housing in the shutdown phase of an internal combustion engine. Oil vapor or oil mist is introduced into to the intake connection piece from the crankcase housing via the crankcase vent line.

Otherwise, the air flowing in the intake connection piece to the internal combustion engine prevents oil particles or foreign particles from reaching the measuring element.

SUMMARY

The device and method according to the present invention has the advantage that liquid and/or solid particles may be separated from a flowing gas/liquid/solid particle mixture in a simple manner.

It is advantageous if the valve is a spring valve since this is a very simple and cost-effective valve.

It is additionally advantageous if the valve is situated in the area of an inlet opening of the line into the channel because, as a result, the separation area of the valve may be situated on the line.

It is advantageous in particular if the valve opens only when the pressure ratio or the pressure difference between an upstream area and a downstream area of the line is correspondingly great because this prevents contamination from spreading in the downstream area of the line.

The line may be designed in such a way that the medium flowing in the line is deflected by approximately 180° at least twice, as a result of which the contaminants, in particular oil or liquids, form a wall film or large drops on an inside wall of the line and thus do not so easily continue to flow along with the flowing medium downstream of a deflecting element.

Solid particles also accumulate on the inside wall and form a mixture with the liquid in the wall film, as a result of which the solid particles with the liquid are separated from the flowing medium.

The flowing medium may be deflected in an advantageous manner in that the deflecting element is in the shape of a plate and is larger in cross-section than a ring having a smaller cross-section than the line in the area of the deflecting element.

The deflecting element may advantageously be a valve plate of a valve.

The line may be connected in an advantageous manner with a channel in which a measuring element is situated to protect the measuring element against contamination even if undesirable contaminants flow from the line into the channel.

It is also advantageous to design the line as a Laval nozzle in the area of an inlet opening into the channel since this accelerates the flow in the channel at that point and foreign particles are more strongly led away from the measuring element.

Moreover, it is advantageous to arrange the line in the area of the inlet opening obliquely to the channel since in this manner the medium is specifically guided out of the channel away from the measuring element.

DETAILED DESCRIPTION

Figure 1:
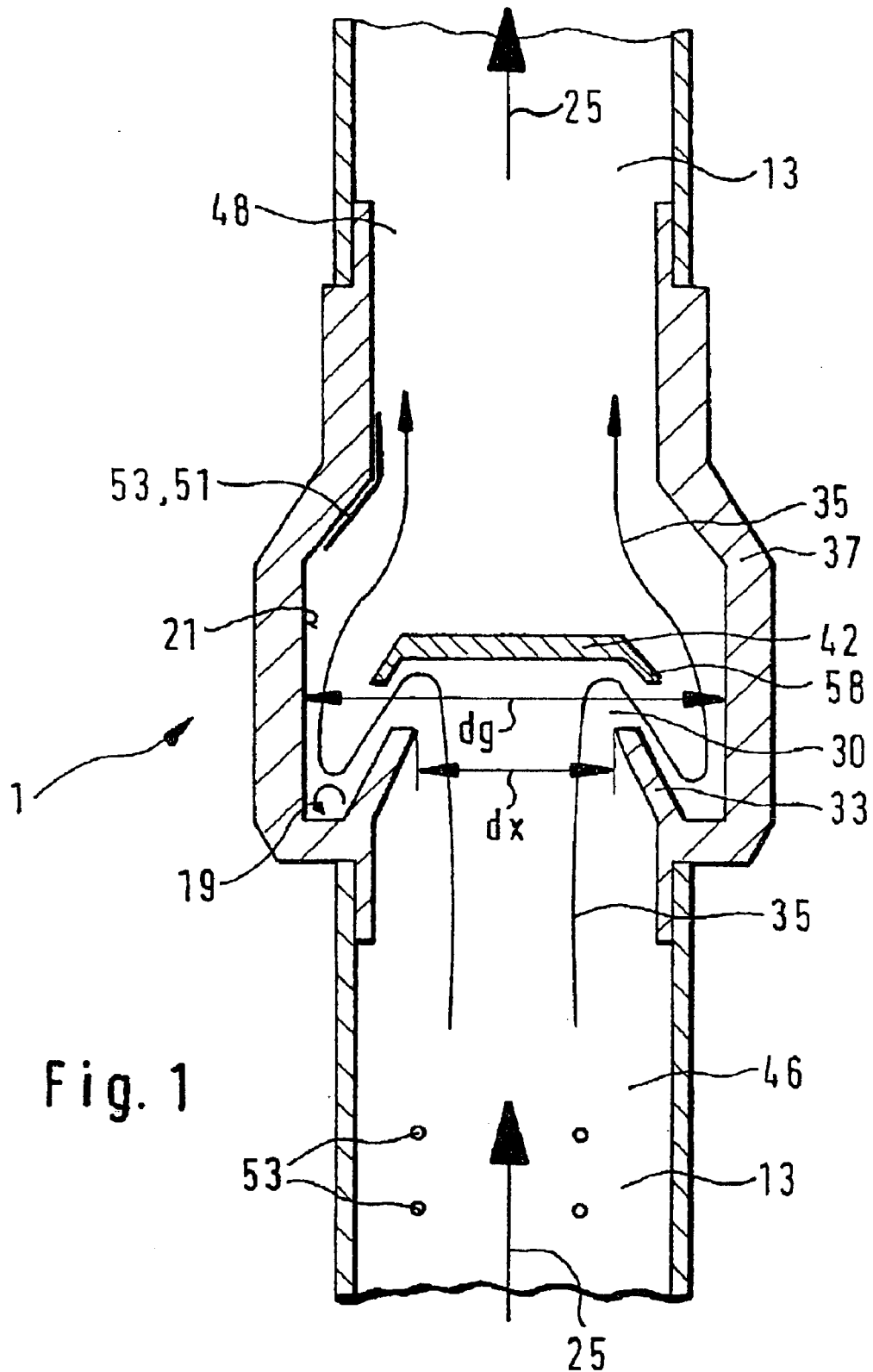
FIG. 1 shows a device according to an embodiment of the present invention.

FIG. 1 shows a device 1 for separating gas and liquid or solid particles from a medium in which a gas/liquid/solid particle mixture flows in a line 13. The medium flows in line 13 in line flow direction 25. Undesirable components, for example, oil vapors or oil particles from a crankcase housing may flow in line 13. In many cases, it is desirable to separate liquid and solid particles from the gas so that the liquid and/or the solid particles do not reach devices present in the line.

To achieve this, a deflecting element 42 is situated in line 13. The medium flowing in line 13 is, for example, deflected at least twice by approximately 180°. This produces separating vortexes 19 which cause oil particles 53 or the oil vapor in the flowing medium to reach inside wall 21 of line 13 and form a wall film 51 there. It is thus possible to speak of a centrifuging of the oil/gas mixture.

Any solid particles present such as, for example, dust particles are also filtered out of the flow in line 13 in this manner. They combine with liquid 53 and/or wall film 51. Wall film 51 moves further on inside wall 21 in line flow direction 25 and the gas moves in the line cross-section. As a result of the fact that a wall film 51 is formed on an inside wall 21 of line 13, negligible or fewer oil particles are contained in the flowing medium of line 13 downstream of deflecting element 42. The remaining liquid and/or solid particles affect devices located further downstream in line 13 at most slightly.

Deflecting element 42 is, for example, in the shape of a plate and is situated in a separation area 30. A plate edge 58 points in the opposite direction of the flowing medium. A ring 33, for example, is situated in separation area 30, the ring being formed at a somewhat oblique angle to the center of channel 13 and having a smaller cross-section or diameter dx than line 13 in separation area 30. Deflecting element 42 projects past ring 33, i.e., if deflecting element 42 were displaced in a straight line towards ring 33 in line flow direction 25 in the direction of ring 33, deflecting element 42 would be in contact with ring 33 and line 13 would be closed.

Lines 35 show an exemplary flow path of a flowing medium in line 13 with formation of separating vortexes 19. Seen in line flow direction 25, the medium first flows through ring 33 and then strikes, frontally for example, deflecting element 42, as a result of which it is deflected by approximately 180°. The medium then flows in an area between ring 33 and a housing 37 of separation area 30. There the flowing medium is again deflected by approximately 180° and flows further in line flow direction 25.

It is also possible to use an arrangement, such as a spiral in which the flowing medium is deflected by 180° several times.

Deflecting element 42 may also form a valve plate 42 of a valve 17 (shown in FIG. 2) which may be a spring valve, for example, which counteracts the pressure in line 13 with its spring force produced by a tension spring 23. Valve 17 with its ram 28, on which valve plate 42 is situated, is guided in line 13, for example by a holder 40, for example, a pipe. Seen in line flow direction 25, there is an upstream area 46 in line 13 upstream of valve 17 and a downstream area 48 downstream of valve 17.

Valve 17 opens only when the pressure ratio or the pressure difference between upstream area 46 and downstream area 48 is correspondingly great. The formation of separating vortexes 19 is thus intensified when the medium flows out under pressure.

Figure 2:
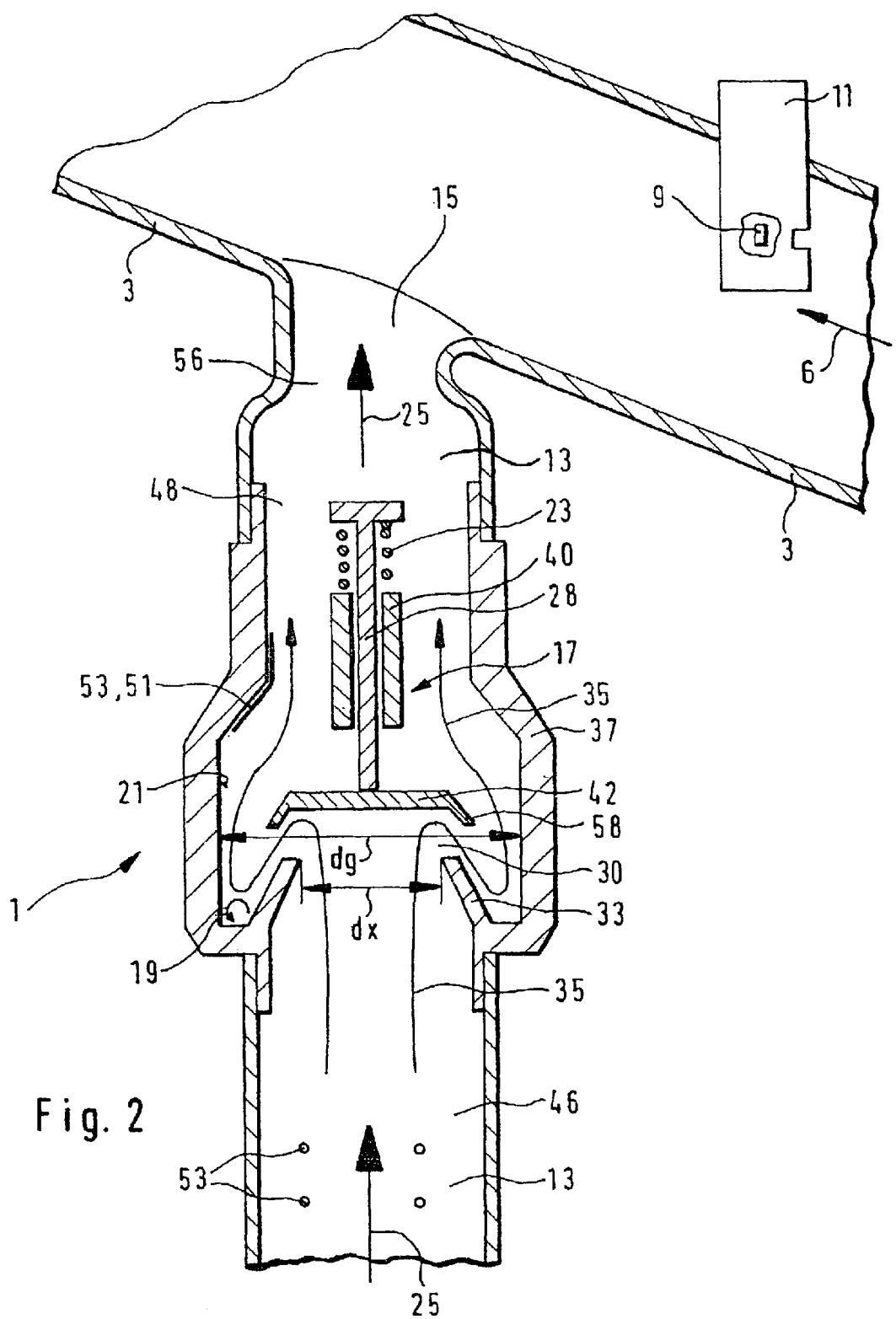
FIG. 2 shows a device according to another embodiment of the present invention having a channel in which the measuring element is situated.

FIG. 2 shows how line 13 opens into a channel 3. In this embodiment, a measuring element 9 in a measuring unit 11 is situated in channel 3, part of the measuring unit extending into channel 3. Measuring element 9 determines, for example, the volume flow of an additional flowing medium, a test medium, in line 13. Channel 3 is, for example, the intake system of an internal combustion engine and the test medium is air. Additional variables that may be measured are, for example, pressure, temperature, concentration of a medium constituent and/or a flow velocity which can be determined using suitable sensors. One or more measuring elements 9 may be present.

In channel 3, there is a main flow direction 6. Downstream of measuring element 9, line 13 opens into channel 3, i.e., line 13 has an inlet opening 15, which produces the connection of line 13 to channel 3. Line 13 is, for example, a vent line for a crankcase housing of the internal combustion engine. Under certain circumstances, contaminants may reach measuring element 9 against direction of flow 6 and permanently influence the measuring characteristics of measuring element 9 in an undesirable manner. In particular in the case of pulsations, i.e., backflow during the operation of the internal combustion engine or after the internal combustion engine is shut down, when no medium flows any longer in channel 3 and oil vapor escapes from line 13, which is connected with the still hot crankcase housing, it is possible for contaminants to reach measuring element 9 from line 13. Valve 17 may also be situated in the area of inlet opening 15.

If, for example, the internal combustion engine is shut down and no vacuum is present in channel 3, valve 17 closes line 13 and oil or foreign particles from the crankcase housing can no longer enter channel 3. Only if the pressure in line 13 is significantly higher than the pressure in channel 3 does valve 17 open. At the same time separating vortexes 19 are again formed.

During the operation of the internal combustion engine, a vacuum exists in channel 3 if air is drawn off for the internal combustion engine, as a result of which valve 17 opens more easily. Oil vapors and foreign particles from line 13 are entrained by the flow in channel 3 in main flow direction 6 away from measuring element 9 and move hardly or not at all in the direction of measuring element 9.

In the area of its inlet opening 15, line 13 may be designed, for example, as a Laval nozzle since this accelerates the flow in line 13 and conveys foreign particles away from measuring element 9 more intensely.

In a like manner, line 13 may be situated obliquely to channel 3 in the area of its inlet opening 15 in order to guide the medium from line 13 away from measuring element 9. In this case, "situated obliquely" implies that a vector component of line flow direction 25 runs approximately parallel to main flow direction 6 in channel 3.

What is claimed is:

1. A device for separating gas from at least one of liquid and solid particles from a mixture including gas and at least one of liquid and solid particles flowing as a medium in a line, comprising:

a deflecting element positioned in the line, the deflecting element deflecting the flowing medium and separating the gas from the at least one of liquid and solid particles out of the flowing medium;

wherein the line opens into a channel in which an additional flowing medium flows, at least one measuring element for determining at least one parameter of the additional flowing medium being positioned in the channel;

wherein the additional flowing medium includes combustion air for an internal combustion engine, and the at least one parameter of the additional flowing medium includes a volumetric flow.

2. The device of claim 1, wherein the line is a crankcase vent line.

3. The device of claim 1, further comprising:

a valve positioned in the line, the valve including a valve plate;

wherein the deflecting element is configured as the valve plate of the valve.

4. The device of claim 3, wherein the line includes an upstream area upstream of the valve and a downstream area downstream of the valve with respect to a line flow direction, and the valve opens when a pressure difference between the upstream area and the downstream area reaches a threshold level.

5. The device of claim 3, wherein the valve is a spring valve.

6. The device of claim 1, wherein the deflecting element is configured within the line such that the flowing medium in the line is deflected at least twice by approximately 180°.

7. The device of claim 1, wherein the deflecting element is formed in the shape of a plate, the plate including a plate edge pointing in a direction opposite to a direction of the flowing medium.

8. The device of claim 1, further comprising:

a separation area situated in the line in which the deflecting element is positioned; and a ring positioned in the separation area, the ring having a smaller cross-section than a cross-section of the line in the separation area;

wherein the deflecting element projects past the cross-section of the ring, perpendicularly to a flow direction of the medium.

9. A device for separating gas from at least one of liquid and solid particles from a mixture including gas and at least one of liquid and solid particles flowing as a medium in a line, comprising:

a deflecting element positioned in the line, the deflecting element deflecting the flowing medium and separating the gas from the at least one of liquid and solid particles out of the flowing medium;

wherein the line opens into a channel in which an additional flowing medium flows, at least one measuring element for determining at least one parameter of the additional flowing medium being positioned in the channel;

the device further comprising:

an inlet opening leading into the channel, the line being configured as a Laval nozzle in an area of the inlet opening.

10. The device of claim 9, wherein a valve is positioned in the area of the inlet opening of the line leading into the channel.

11. The device of claim 9, wherein the line is positioned obliquely in the area of the inlet opening of the line leading into the channel so that a vector component of a line flow direction runs approximately parallel to a main flow direction in the channel.

12. The device of claim 9, wherein the deflecting element is configured within the line such that the flowing medium in the line is deflected at least twice by approximately 180°.

13. The device of claim 9, wherein the deflecting element is formed in the shape of a plate, the plate including a plate edge pointing in a direction opposite to a direction of the flowing medium.

14. The device of claim 9, further comprising:

a separation area situated in the line in which the deflecting element is positioned; and a ring positioned in the separation area, the ring having a smaller cross-section than a cross-section of the line in the separation area;

wherein the deflecting element projects past the cross-section of the ring, perpendicularly to a flow direction of the medium.

15. The device of claim 9, further comprising:

a valve positioned in the line, the valve including a valve plate;

wherein the deflecting element is configured as the valve plate of the valve.

16. The device of claim 15, wherein the line includes an upstream area upstream of the valve and a downstream area downstream of the valve with respect to a line flow direction, and the valve opens when a pressure difference between the upstream area and the downstream area reaches a threshold level.

17. The device of claim 15, wherein the valve is a spring valve.

18. A method of separating gas from at least one of liquid and solid particles in a medium flowing in a line from a mixture of gas and at least one of liquid and solid particles, the method comprising:

deflecting the medium using a deflecting element positioned in the line;

forming separating vortices, the vortices subjecting the at least one of liquid and solid particles to a centrifugal force;

diverting the at least one of liquid and solid particles to an inside wall of the line; and determining at least one parameter of an additional flowing medium flowing in a channel, the line opening into the channel, the additional flowing medium including combustion air for an internal combustion engine, the at least one parameter including a volumetric flow.

19. The method of claim 18, wherein diverted liquid particles of the medium at least partially forms a wall film on the inside wall of the line.

20. The method of claim 18, further comprising:

deflecting the flowing medium in the line at least twice by approximately 180°.

21. A method of separating gas from at least one of liquid and solid particles in a medium flowing in a line from a mixture of gas and at least one of liquid and solid particles, the method comprising:

deflecting the medium using a deflecting element positioned in the line;

forming separating vortices, the vortices subjecting the at least one of liquid and solid particles to a centrifugal force;

diverting the at least one of liquid and solid particles to an inside wall of the line; and determining at least one parameter of an additional flowing medium flowing in a channel;

wherein an inlet opening leads into the channel, the line configured as a Laval nozzle in an area of the inlet opening.

22. A device for separating gas from at least one of liquid and solid particles from a mixture including gas and at least one of liquid and solid particles flowing as a medium in a line, comprising:

a deflecting element positioned in the line, the deflecting element deflecting the flowing medium and separating the gas from the at least one of liquid and solid particles out of the flowing medium;

a valve positioned in the line, the valve including a valve plate;

a separation area situated in the line in which the deflecting element is positioned; and a ring positioned in the separation area, the ring having a smaller cross-section than a cross-section of the line in the separation area;

wherein the deflecting element is configured as the valve plate of the valve;

wherein the line includes an upstream area upstream of the valve and a downstream area downstream of the valve with respect to a line flow direction, and the valve opens when a pressure difference between the upstream area and the downstream area reaches a threshold level;

wherein the line opens into a channel in which an additional flowing medium flows, at least one measuring element for determining at least one parameter of the additional flowing medium being positioned in the channel;

wherein the additional flowing medium includes combustion air for an internal combustion engine, and the at least one parameter of the additional flowing medium includes a volumetric flow;

wherein the deflecting element projects past the cross-section of the ring, perpendicularly to a flow direction of the medium; and wherein the valve is a spring valve.

* * * * *